(12) United States Patent
Chang et al.

(10) Patent No.: US 7,472,042 B2
(45) Date of Patent: Dec. 30, 2008

(54) SURFACE PROFILE MEASURING METHOD

(75) Inventors: Hung-Chang Chang, Kaohsiung (TW); Yaomin Lin, Hsinchu (TW)

(73) Assignee: Chroma Ate Inc., Taoyuan Hsien (TW)

( * ) Notice: Subject to any disclaimer, the term of this patent is extended or adjusted under 35 U.S.C. 154(b) by 131 days.

(21) Appl. No.: 11/486,309

(22) Filed: Jul. 14, 2006

(65) Prior Publication Data

US 2008/0013100 A1 Jan. 17, 2008

(51) Int. Cl.
*G01B 11/24* (2006.01)
*G01B 11/00* (2006.01)

(52) U.S. Cl. .............. 702/189; 702/166; 702/167; 356/511; 356/512

(58) Field of Classification Search ............... 702/189, 702/66, 69, 166, 167
See application file for complete search history.

(56) References Cited

U.S. PATENT DOCUMENTS 6,552,806 B1 * 4/2003 Swinford et al. ............ 356/512
7,283,250 B2 * 10/2007 Schmit et al. ............... 356/512
7,321,431 B2 * 1/2008 De Groot .................... 356/497
2007/0097380 A1 * 5/2007 De Groot et al. ............ 356/511

FOREIGN PATENT DOCUMENTS

TW 513552 12/2002

* cited by examiner

*Primary Examiner*—Hal D Wachsman
(74) *Attorney, Agent, or Firm*—Troxell Law Office, PLLC

(57) ABSTRACT

A surface profile measuring method using a broad bandwidth light source illuminating a sample surface and a reference surface through a splitter is provided. By changing a distance between the sample surface and the reference surface with a constant step, an interference diagram with a waveform composed of interference data points depicting a relationship of surface height versus illumination intensity is generated. In the beginning, a first data point with greatest illumination intensity is selected from the interference data points on the waveform. Then, a second data point is selected from the data points on the waveform within a predetermined range centered at the first data point to have the waveform showing best quality of symmetry. Then, a peak of a fringe defined by the second data point and its neighboring data points is estimated by using phase compensating approach.

15 Claims, 5 Drawing Sheets

SURFACE PROFILE MEASURING METHOD

BACKGROUND OF THE INVENTION (1) Field of the Invention

The present invention relates to a surface profile measuring method and an apparatus thereof, and more particularly relates to an non-contact surface profile measuring method with broad bandwidth light source.

(2) Description of the Prior Art

Non-contact surface profile measuring apparatus specified with white-light interferometry is widely used for high accuracy demands such as measurements of surface profile of semiconductor wafers, LCD substrates, and etc.

FIG. 1 shows a typical non-contact surface profile measuring apparatus. The apparatus has a light source 10, a collimation lens 20, a 45 degree splitter 30, an imaging lens 40, an image sensing device 40, an interferometer 60, a stage 70, and a computer system 80. Light beam generated from the light source 10 is directed by the collimation lens 20 to the splitter 30, and following reflected by the splitter 30 to the interferometer 60.

The interferometer 60 is located right above the stage 70 and aligned to the sample surface 90 on the stage 70. The interferometer 60 has a microscope objective 62, a reflector 64, and a splitter 66. The microscope objective 62 is located above the reflector 64. The reflector 64 is located above the splitter 66. Part of the beam penetrating the microscope objective 62 is reflected by the splitter 66 upward and re-reflected by the reflector 64 downward. On the other hand, part of the beam penetrating the microscope objective 62 just penetrates the splitter 66 downward directly.

The beams reflected by the splitter 66 and penetrating the splitter 66 are reflected by the sample surface 90 and recombined at the splitter 66. Then. the recombined light beam penetrates the microscope objective 62 upward, through the splitter 30 and the imaging lens 40, to focus on the image sensing device 50. It is predictable that the optical paths of the two beams recombined at the splitter 66 are different.

It is noted that the value of optical path difference (OPD) of the two beams is decided by the distance between the interferometer 60 and the stage 70. By changing the vertical position of the interferometer 60 with respect to the stage 70 with constant step, a serial of interference images with respect to different OPD values are accessed by the image sensing device 50. The pixels of the interference images with respect to the same location on the sample surface 90 are pooled by the computer system 80 to generate the waveform as shown in FIG. 2, which depicts a relationship of intensity versus surface height. The waveform shown in FIG. 2 characterized with an "envelope" is a typical white light interferometry waveform. The peak of the envelope is usually used for deciding the height of the specific location on the sample surface. Respected height of different locations on the sample surface can be derived by using the same method to establish the surface profile of the whole sample surface.

Basically, the methods for determining the peak location of the envelop on the waveform may be classified into the phase-shifting interferometry (PSI) method and the vertical scanning interferometry (VSI) method.

The phase-shifting interferometry method adapts the cosine wave with regular phase variation in the interference diagram. Phase difference of cosine waves corresponding to different locations on the sample surface is used to derive the surface profile. As mentioned, it is noticed that the phase-shifting interferometry method is only applicable for measuring smooth surfaces. A rough surface with sharp steps greater than a quarter of wavelength of the light beam may be wrongly measured.

The vertical scanning interferometry method is implemented to determine the surface height by estimating the location of maximum intensity or the symmetrical center of the waveform. The vertical scanning interferometry method can be used for measuring rough surfaces. However, the accuracy of this method is much worse in compared with phase-shifting interferometry method.

Some technologies for estimating surface height are provided as follows:

The technology taught in U.S. Pat. No. 5,633,715 adapts centroid approach for estimating modulated peak in broad bandwidth interferometry. This method calculates the centroid, which may be understood as center of mass, of a predetermined function I'(z) to estimate z location of maximum fringe contrast. However, once the interference fringes are not perfectly symmetrical, error between centroid of the function and actual location of minimum OPD is unpreventable. In addition, this approach cannot resist the influence of unwanted environmental noise. In case of great vertical scanning distance or large environmental noise, the error becomes significant.

The technology provided in U.S. Pat. No. 5,133,601 scans a sample surface vertically with a step corresponding to 90 degree phase-shift to generate interference fringes. This method calculates the contrast of fringes by selecting three or five straight data points on the waveform. The fringe with greatest contrast is regarded as the central fringe corresponding to minimum OPD. After determining the central fringe, the location corresponding to zero OPD is estimated by phase compensating approach on the central fringe.

This technology has the drawbacks as follows. Firstly, the calculation of fringe contrast generates a great amount of data and wastes a lot of time. Secondly, the noise near the actual central fringe may influence the estimation of fringe with greatest contrast. By the way, the calculated location corresponding to zero OPD may show an error of 360 degree phase-shift with respect to the location corresponding to actual zero OPD.

The technology provided in U.S. Pat. No. 5,398,113 converts the interference data to frequency domain by using transformation approaches such as Fourier transform for further calculation. The precise location corresponding to zero OPD is estimated by using least square fitting approach. This technology can measure the surface profile with high accuracy, whereas, the operation of transformation and least square fitting approach waste a lot of time and generate a huge amount of data.

As mentioned, the technologies taught in the related art can not prevent the influence from environmental noise or generates a great amount of data and waste a lot of time. Thus, this invention is directed at improving both the accuracy and the calculating speed of surface profile measurement simultaneously.

SUMMARY OF THE INVENTION

It is an object of the present invention to minimize the influence of environmental noise for the measuring of surface profile.

It is another object of the present invention to provide a surface profile measuring method fulfilling the demands of both accuracy and speed.

The surface profile measuring method provided in the present invention has the advantage of estimating the location of zero OPD on the waveform of the interference diagram precisely and quickly.

The surface profile measuring method provided in the present invention is to select a first interference fringe with greatest illumination intensity on the waveform firstly. A second interference fringe is then selected within a predetermined range center at the first interference fringe to have the waveform showing best quality of symmetry. Afterward, the precise location of peak of the second interference fringe regarded as the location of zero OPD is estimated by using a typical phase compensating approach.

According to the mentioned surface profile measuring method, a surface profile measuring apparatus is also provided in the present invention. The surface profile measuring apparatus has a broad bandwidth light source, a splitter, a vertical position adjusting module, a sensing module, an interference diagram forming module, an intensity determining module, a quality of symmetry determining module, and a phase compensating module. The broad bandwidth light source is utilized for generating a light beam. The splitter is utilized for splitting the light beam toward a sample surface and a reference surface. The vertical position adjusting module is utilized for changing a distance between the sample surface and the splitter with a constant step. The sensing module is utilized for accessing interference images generated by the light beams reflected by the sample surface and the reference surface. Thereby, the interference diagram forming module generates interference diagrams with waveforms composed of interference data points depicting a relationship of surface height versus illumination intensity by using the interference images.

The intensity determining module selects a first data point on the waveform corresponding to an interference fringe with greatest intensity. The quality of symmetry determining module selects a second data point from the first data point and its neighboring data points to have the waveform showing best quality of symmetry. The phase compensating module estimates respected surface height of a peak of a fringe defined by the second data point and closest data points thereof.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

Figure 1:
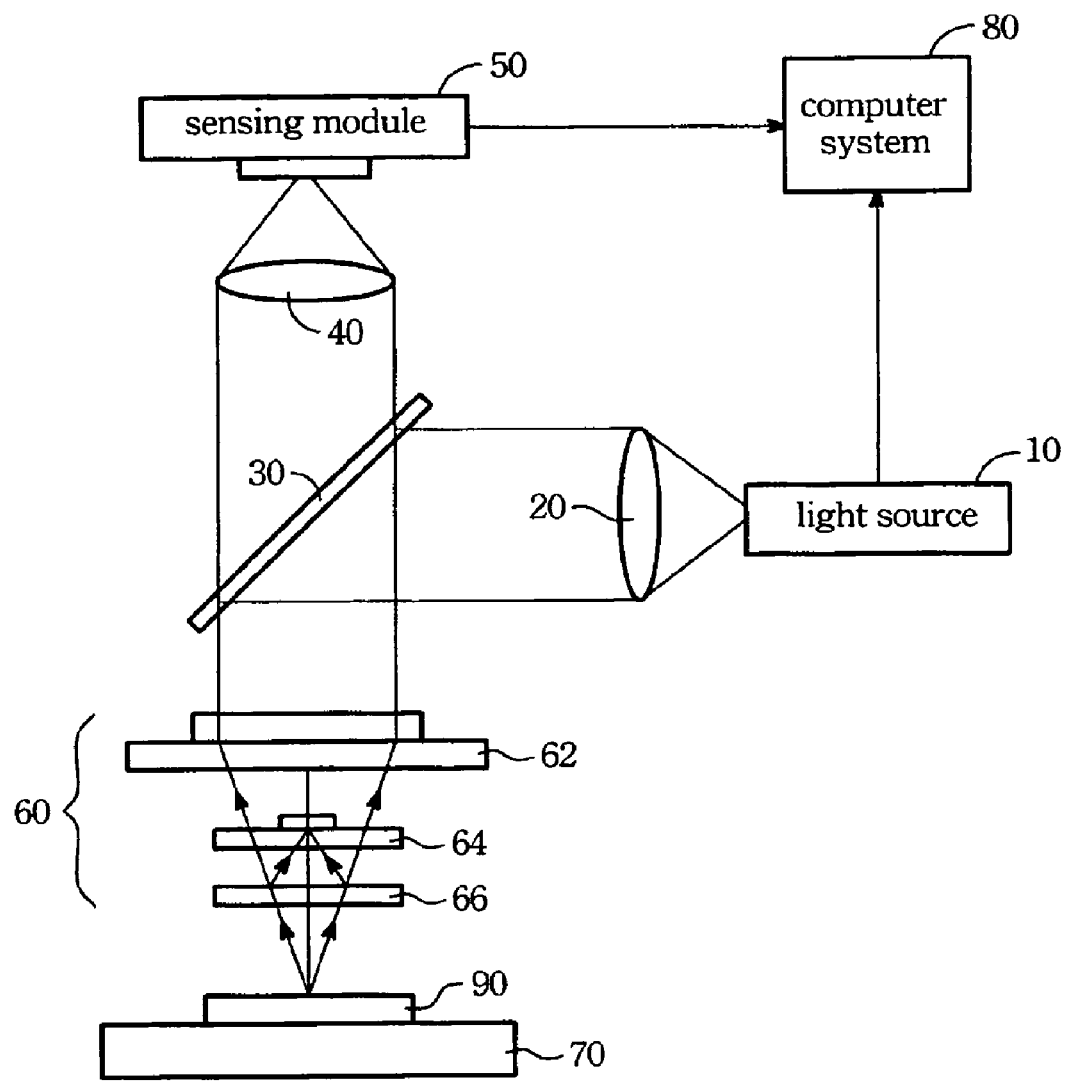
FIG. 1 is a schematic view of a typical surface profile measuring apparatus.
Figure 2:
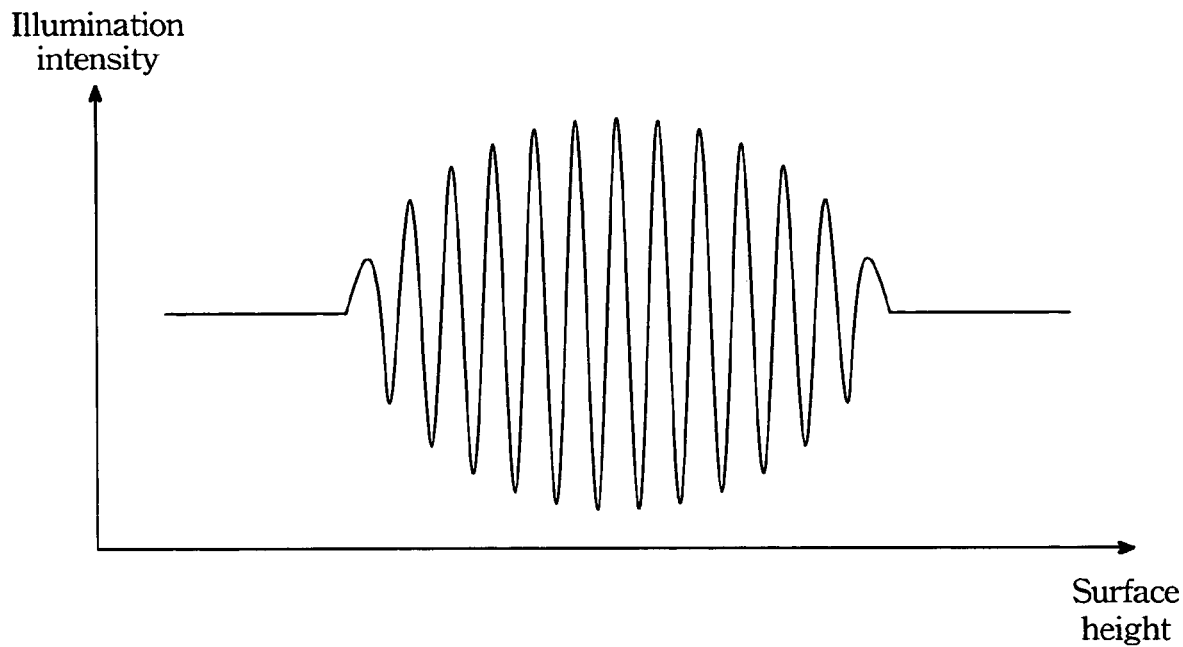
FIG. 2 shows typical waveform of white-light interference.
Figure 3:
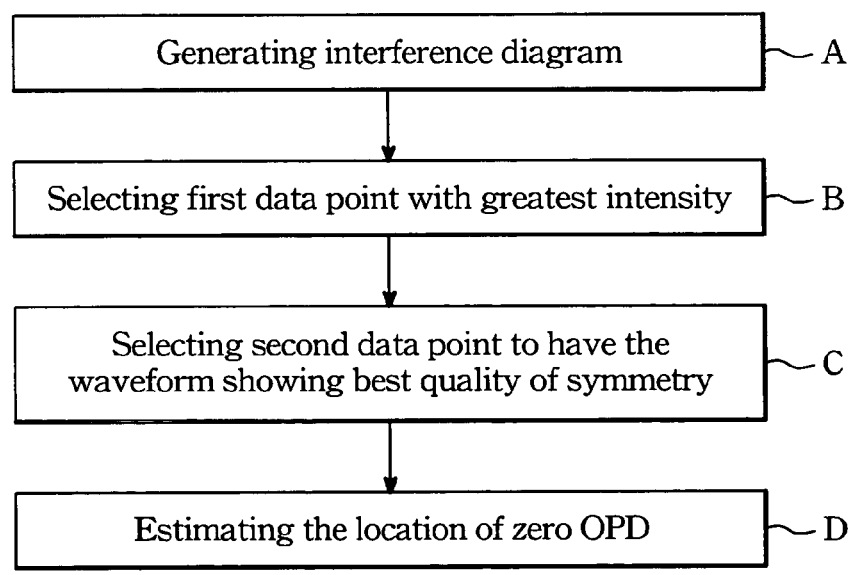
FIG. 3 is a flow-chart showing a preferred embodiment of a surface profile measuring method in accordance with the present invention.

FIG. 3 is a flow chart showing a preferred embodiment of a surface profile measuring method in accordance with the present invention. In step A, a light beam provided by a broad bandwidth light source is split by a beam splitter 66 to illuminate on a sample surface and a reference surface (also referring to FIG. 4). By changing the distance between the sample surface and the splitter with constant step, a waveform composed of interference data points showing a relationship of surface height versus illumination intensity as shown in FIG. 2 is generated.

Figure 3A:
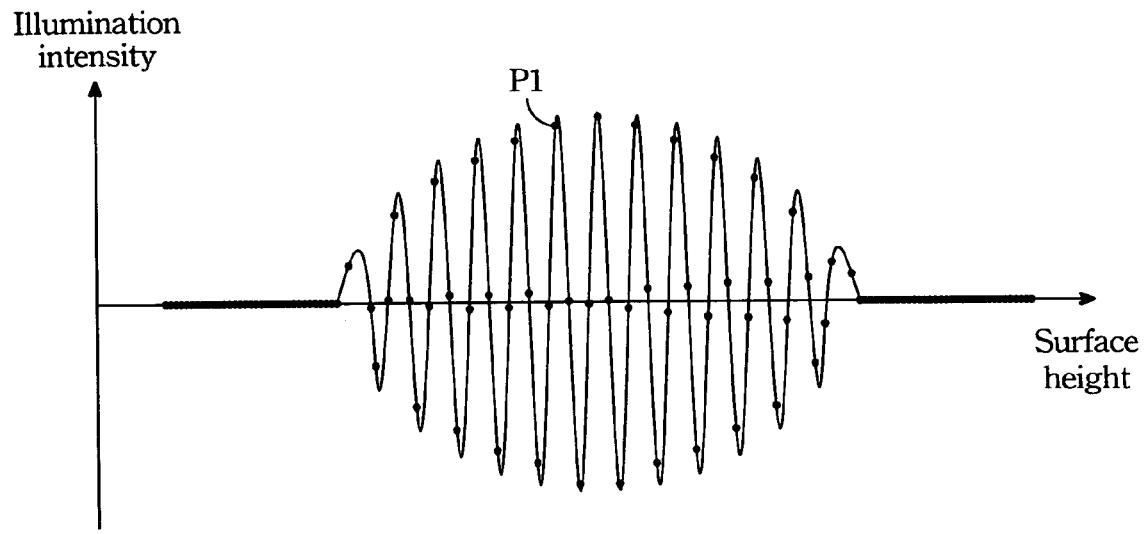
FIG. 3A is a schematic view depicting step B in FIG. 3 for selecting the first data point.

Then, in step B, a first data point P1 with greatest intensity is selected from the data points on the waveform to roughly define the location of a first fringe corresponding to greatest intensity, as shown in FIG. 3A.

Figure 3B:
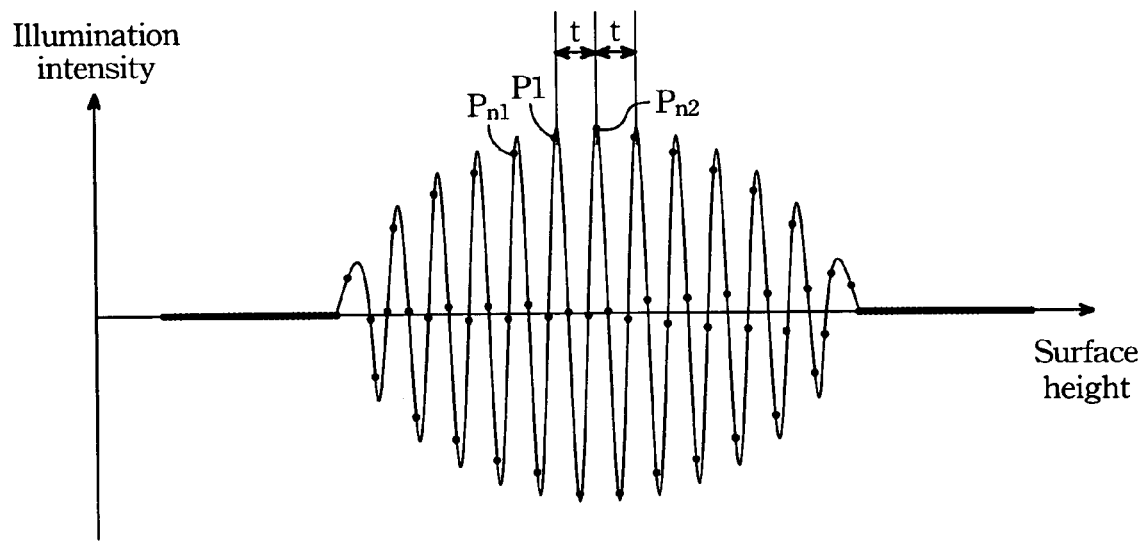
FIG. 3B is a schematic view depicting step C in FIG. 3 of selecting the first data point and its neighboring data points.

Afterward, in step C, also referring to FIG. 3B, a second data point is selected from the data first data point and a predetermined number of neighboring data points Pn1, Pn2 to have the waveform showing best quality of symmetry with respect to the second data point.

These data points Pn1, Pn2 are selected from the neighboring data points within a predetermined range centered at the first data point P1 with a predetermined interval t. It is noticed that the first data point P1 and the selected data points Pn1, Pn2 should be located on different interference fringes. In addition, the selected data points Pn1, Pn2 had better be the data point with greatest intensity on the respected interference fringe. Thus, as the preferred embodiment, the interval t is respected to a phase-shift of about 360 degree on the interference diagram.

Figure 3C:
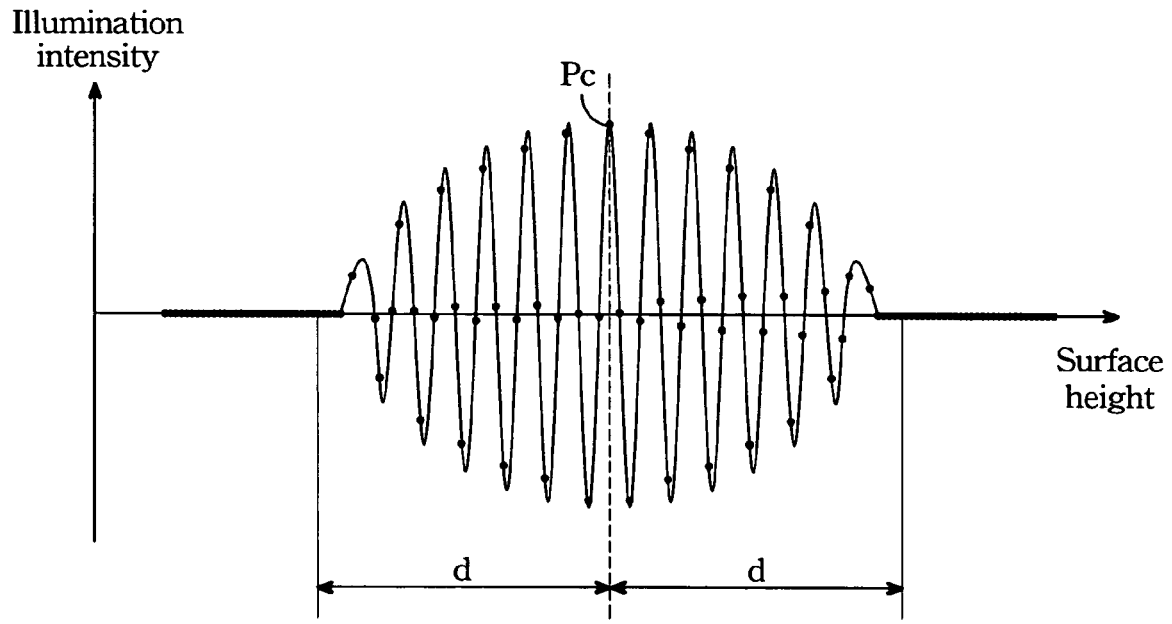
FIG. 3C is a schematic view depicting step C in FIG. 3 for computing quality of symmetry of the waveform.

Afterward, the first data point P1 and the selected data points Pn1, Pn2 are set as center points Pc respectively for computing quality of symmetry of the waveform. As shown in FIG. 3C, the computing process integrating deviations on the waveform within a predetermined range d of both sides of the centered data point. That is, absolute values of respected intensity of all neighboring data points within the predetermined range d are integrated. The difference of the integrated values of the waveform of both sides of the center point Pc represents the quality of symmetry. It is noted that the range d should be great enough to cover the whole envelope on the waveform for computing the quality of symmetry correctly.

After comparing the resulted difference corresponding the data points P1, Pn1, Pn2, the second data point P2, which has the waveform showing best quality of symmetry, is decided as the data point with respect to smallest difference.

Therefore, the above mentioned step C may be understood as selecting a second fringe, which is corresponding to the second data point P2, from the first fringe and its neighboring fringes as shown in FIG. 3A, and the waveform shows best quality of symmetry with respect to the second interference fringe, which is regarded as the central fringe.

It is noted that the density of interference data points on the waveform for forming the interference diagram in step A influences the selection of data points in step C. The density of interference data points is decided by the constant step for changing OPD. For example, as the constant step is respected to a phase-shift of 90 degree, as a preferred embodiment, the distance between the selected data points in step C and the first data points should be substantially identical to an integer times four constant step.

Afterward, in step D, the precise location of zero OPD, which is also the peak of the central fringe, is estimated by using the phase compensating approach with the second data point P2 and its closest data point Pm1, Pm2, Pm3, Pm4.

It is noted that the density of data point for forming the interference diagram in step A also influences the selection of data points in step D. For example, as the constant step is respected to a phase difference of 90 degree, as a preferred embodiment, the second data point P2 and it four closest data points Pm1, Pm2, Pm3, Pm4 are used for proceeding the phase compensating approach as follows:

$$\Phi = \tan^{-1}(2(\text{Ipm2} - \text{Ipm3})/(2\text{Ipc} - \text{Ipm1} - \text{Ipm4})) \quad (1)$$

Where, $\Phi$ is the phase difference between the second data point and the position with respect to zero OPD; the Ipm1 Ipm2 Ipm3 and Ipm4 are the respected illumination intensity of the four closest data points Pm1,Pm2,Pm3,Pm4 with respect to second data point; and Ipc is the respected illumination intensity of the second data point.

Then, the phase difference is used for estimating the difference between the surface height corresponding to the second data point and the surface height corresponding to the position with respect to zero OPD as follows:

$$\Delta h = \Phi \lambda / 4\pi \quad (2)$$

Thereby, the surface height with respect to zero OPD is calculated as follow:

$$h0 = hp2 + \Delta h \quad (3)$$

Where, hp2 is the surface height corresponding to the second data point P2.

Figure 4:
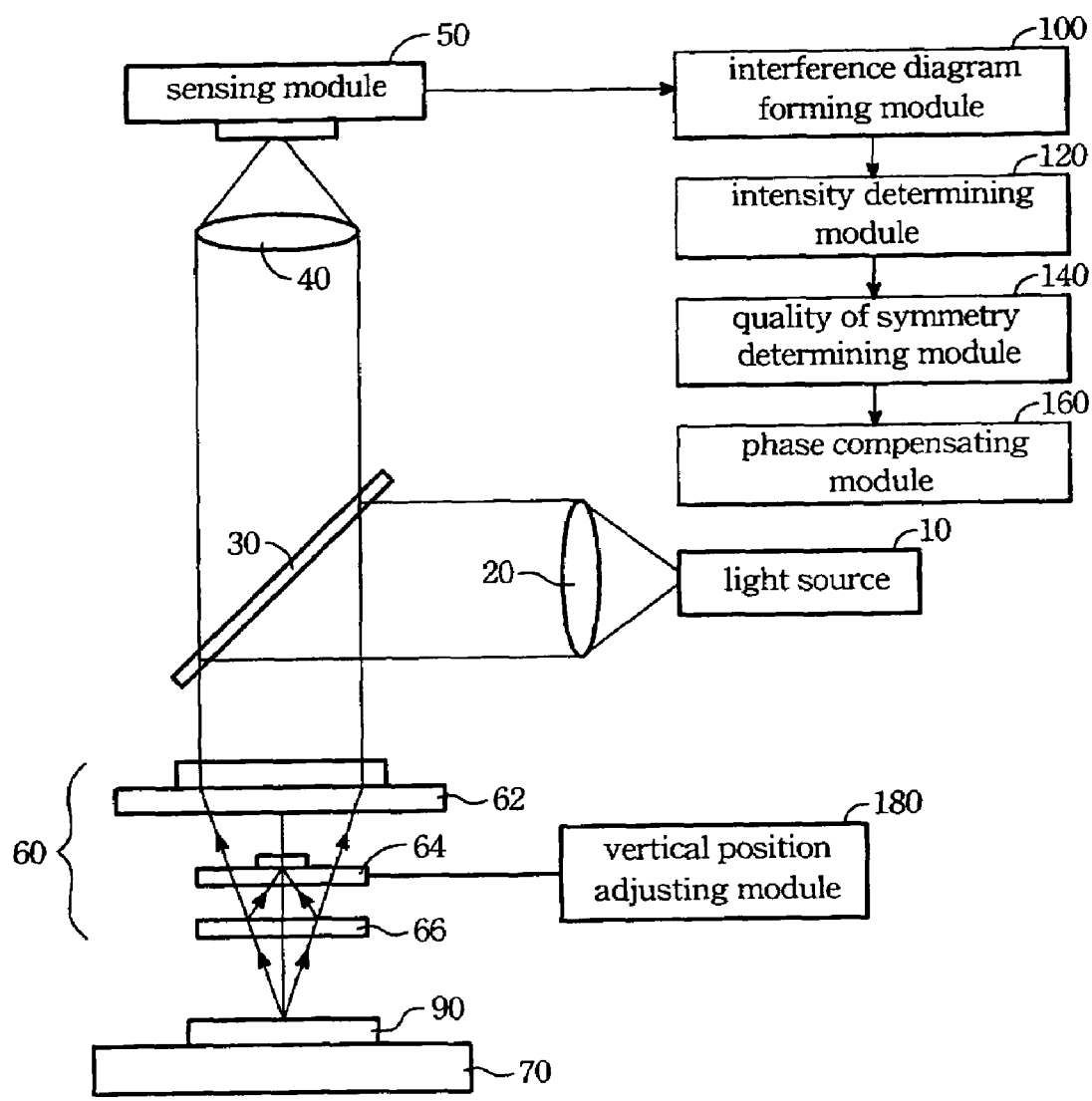
FIG. 4 is a schematic view showing a preferred embodiment of a surface profile measuring apparatus in accordance with the present invention.

FIG. 4 is a preferred embodiment showing a surface profile measuring apparatus in accordance with the present invention. As shown, the surface profile measuring apparatus has a broad bandwidth light source 10, a collimation lens 20, a 45 degree splitter 30, an image lens 40, an interferometer 60, a stage 70, a vertical position adjusting module 180, a sensing module 50, an interference diagram forming module 100, an intensity determining module 120, a quality of symmetry determining module 140, and a phase compensating module 160.

The broad bandwidth light source 10 generates a light beam penetrating the collimation lens 20 to form a parallel beam illuminating the splitter 30. The parallel beam is reflected by the splitter 30 to the interferometer 60. The interferometer 60 is located right above the stage 70 and aligns to the sample surface 90 on the stage 70. The interferometer 60 has an object lens 62, a reflector 64, and a beam splitter 66. The light beam from the splitter 30 penetrating the object lens 62 is divided into two beams by the beam splitter 66. The two beams are reflected by the reflector 64 and the sample surface 90 respectively and recombined in the beam splitter 66 to generate a light beam with interference. The light beam illuminates upward through the object lens 62 and the splitter 30, and focusing on the sensing module 50 through the imaging lens 40.

The broad bandwidth light source is utilized for generating a light beam. The splitter is utilized for splitting the light beam toward a sample surface and a reference surface. The vertical position adjusting module is utilized for changing a distance between the sample surface and the splitter with a constant step. The sensing module is utilized for accessing interference images generated by the light beams reflected by the sample surface and the reference surface. Thereby, the interference diagram forming module generates interference diagrams with waveforms composed of interference data points depicting a relationship of surface height versus illumination intensity by using the interference images.

The vertical position adjusting module 180 adjusts OPD of the two reflected beams by changing the distance between the sample surface 90 and the splitter 66 with a constant step.

Thereby, the sensing module 50 accesses a serial of interference images with respect to different OPDs. It is noted that various pixels on the interference image correspond to different locations on the sample surface.

The interference diagram forming module 100 uses the intensity of pixels on these interference images corresponding to identical location on the sample surface and the respected distance between the sample surface 90 and the reflector (which may be regarded as a reference surface) to generate an interference diagram with a waveform composed of interference data point depicting a relationship of surface height versus illumination intensity.

Figure 3D:
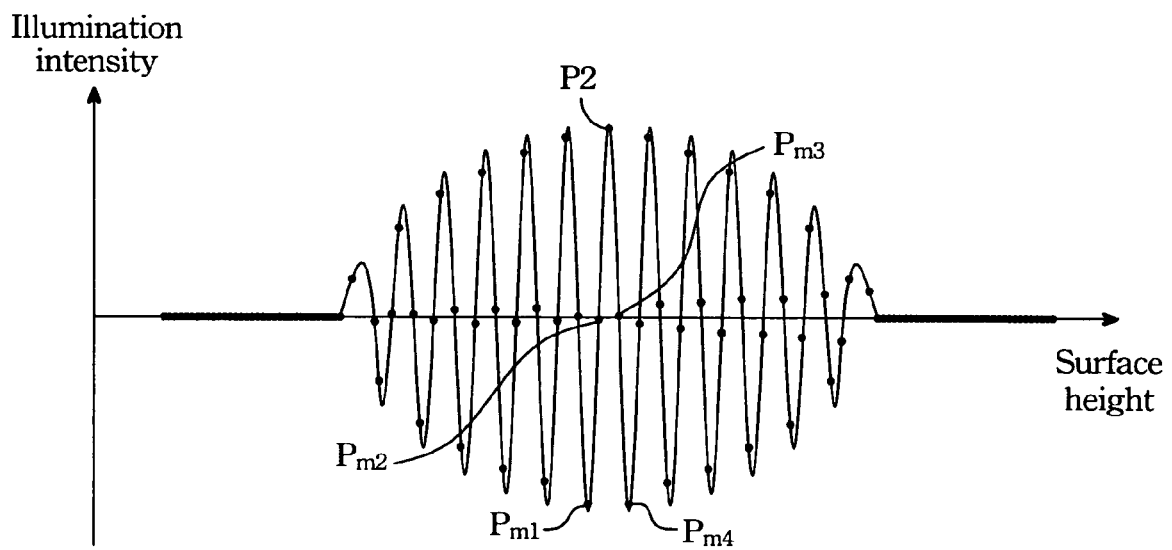
FIG. 3D is a schematic view depicting step D in FIG. 3 for estimating the location with respect to zero OPD on the central fringe.

Also referring to FIG. 3A, the intensity determination module 120 is used to select the first data point with greatest intensity on the waveform. Also referring to FIGS. 3B and 3C, the quality of symmetry determining module 140 is used to select the second data point P2 from the first data point and its neighboring data points by computing the quality of symmetry of the waveform with respect to these data point P1, Pn1, Pn2. Also referring to FIG. 3D, the phase compensating module 160 is used to estimate the location of zero OPD, which is regarded as the respected surface height of a peak of a fringe defined by the second data point P2 determined by the quality of symmetry determining module 140 and its closest data points Pm1, Pm2, Pm3, Pm4, by using the data of these data points P2, Pm1, Pm2, Pm3, Pm4.

Step B of the method in accordance with the present invention determines the first data point P1 with greatest intensity on the waveform, which involves simple comparing procedures and prevents the waste of time. In addition, for the typical interference diagram, unless a dark point is concerned, the location of greatest intensity is definitely adjacent to the location of central fringe. Thus, the first data point P1 determined in step B should be adjacent to the central fringe.

After roughly estimating the location of central fringe in step B, the approach of deciding the symmetrical center of the envelope on the waveform is applied in step C to figure out the second data point P2 for further determining the location of central fringe. It is noted that white-light interferometry usually generates a narrow envelope. In addition, referring to FIG. 3C, the approach of deciding the symmetrical center of the envelop, which determines quality of symmetry based on the data points P2, Pm1, Pm2, Pm3, and Pm4, adapts merely simple mathematical operations. Thus, a preferred calculation speed can be achieved. Moreover, since environmental noise usually shows similar influence for the waveform at both sides of the central fringe, the approach of determining the location of central fringe by comparing quality of symmetry prevents the influence of environmental noise.

Step D uses the phase compensating approach to estimate precise location of zero OPD on the central fringe accessed in step C, which may achieves an accuracy corresponding to typical phase-shifting interferometry. In compared with the typical phase-shifting interferometry, since the central fringe has been determined in steps B and C of the present invention, the method provided in the present invention can be used to measure rough surfaces with sharp step, and the time for build up the phase by using phase-shifting interferometry may be saved.

While the embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A surface profile measuring method using a broad bandwidth light source illuminating a sample surface and a reference surface through a splitter, by changing a distance between the sample surface and the reference surface with a constant step, an interference diagram with a waveform composed of interference data points depicting a relationship of surface height versus illumination intensity is generated, the surface profile measuring method comprises the steps of:
   selecting a first interference data point with greatest illumination intensity from the interference data points on the waveform;
   selecting a second interference data point from the interference data points on the waveform with in a predetermined range centered at the first interference data point to have the waveform showing best quality of symmetry; and
   estimating a peak of a fringe defined by the second interference data point by using the second interference data point and neighboring interference data points of the second interference data point.

2. The surface profile measuring method of claim 1, wherein the step of selecting the second interference data point comprising:
   selecting a plurality of interference data points on the waveform with a predetermined spacing from the first interference data point to have the selected interference data points and the first interference data point being located on different interference fringes; and
   comparing quality of symmetry of the waveform centered at the first interference data point and the selected interference data points within the predetermined range, respectively.

3. The surface profile measuring method of claim 2, wherein the step of comparing quality of symmetry comprising:
   integrating deviations on the waveform of both sides of the a waveform center selected from first interference data point and the selected interference data points; and
   calculating a difference of the integrated values of the waveform of both sides of the waveform center, and the waveform centered at the interference data point with respect to smallest difference having best quality of symmetry.

4. The surface profile measuring method of claim 2, wherein the predetermined spacing is respective to a phase difference of 360 degree.

5. The surface profile measuring method of claim 2, wherein the selected interference data points within the predetermined range are away from the first interference data point with a distance substantially identical to an integer times four constant steps.

6. The surface profile measuring method of claim 1, wherein the constant step is respective to a phase difference of 90 degree.

7. The surface profile measuring method of claim 1, wherein the step of estimating the peak of the fringe comprises: computing a phase difference by using the data of the second interference data point and four closest interference data points thereof; and estimating a difference between height of the peak of the fringe and height corresponding to the second interference data point by using the phase difference.

8. A surface profile measuring method using a broad bandwidth light source illuminating an sample surface and a reference surface through a splitter, by changing a distance between the sample surface and the reference surface with a constant step, an interference diagram with a waveform composed of interference data points depicting a relationship of surface height versus illumination intensity is generated, the surface profile measuring method comprising the steps of:
   selecting a first interference fringe with the greatest illumination intensity on the waveform;
   selecting a second interference fringe on the waveform in a predetermined range centered at the first interference fringe to have the waveform showing best quality of symmetry; and
   estimating the respective surface height of a peak of the second interference fringe by using data of the interference data points on the second interference fringe.

9. The surface profile measuring method of claim 8, wherein the step of selecting the first interference fringe selects a first interference data point with the greatest illumination intensity from the interference data points on the waveform to decide the first interference fringe.

10. The surface profile measuring method of claim 9, wherein the step of selecting the second interference fringe comprises the steps of:
   selecting a plurality of interference data points corresponding to different interference fringes with a predetermined spacing from the first interference data point; and
   comparing quality of symmetry of the waveform centered at the first interference data point and the selected interference data points.

11. The surface profile measuring method of claim 10, wherein the step of comparing quality of symmetry comprising:
   integrating deviations on the waveform of both sides of a waveform center selected from first interference data point and the selected interference data points; and
   calculating a difference of the integrated values of the waveform of both sides of the waveform center, and the waveform centered at the interference data point with respect to smallest difference having best quality of symmetry.

12. The surface profile measuring method of claim 10, wherein the predetermined spacing is respective to a phase-shift of 360 degree.

13. The surface profile measuring method of claim 10, wherein the selected interference data points are away from the first interference data point with a distance substantially identical to an integer times four constant steps.

14. The surface profile measuring method of claim 8, wherein the constant step is respective to a phase-shift of 90 degree.

15. The surface profile measuring method of claim 8, wherein the step of estimating the respective surface height of the peak of the second interference fringe applies a phase compensating approach with the interference data points on the second interference fringe.

* * * * *